US012666489B2

(12) United States Patent
Medina et al.

(10) Patent No.: US 12,666,489 B2
(45) Date of Patent: Jun. 23, 2026

(54) RADIO RESOURCE RESERVATION FOR INTER-UE COORDINATION IN NR SIDELINK MODE 2

(71) Applicant: Nokia Technologies Oy, Espoo (FI)

(72) Inventors: Daniel Medina, Munich (DE); Nuno Manuel Kiilerich Pratas, Aalborg (DK); Torsten Wildschek, Gloucester (GB)

(73) Assignee: Nokia Technologies Oy, Espoo (FI)

( * ) Notice: Subject to any disclaimer, the term of this patent is extended or adjusted under 35 U.S.C. 154(b) by 299 days.

(21) Appl. No.: 18/563,737

(22) PCT Filed: Jun. 6, 2022

(86) PCT No.: PCT/FI2022/050386
§ 371 (c)(1),
(2) Date: Nov. 22, 2023

(87) PCT Pub. No.: WO2023/012398
PCT Pub. Date: Feb. 9, 2023

(65) Prior Publication Data
US 2024/0224368 A1 Jul. 4, 2024

Related U.S. Application Data

(60) Provisional application No. 63/228,864, filed on Aug. 3, 2021.

(51) Int. Cl.
*H04W 76/20* (2018.01)
*H04L 1/08* (2006.01)
(Continued)

(52) U.S. Cl.
CPC ............... *H04W 76/20* (2018.02); *H04L 1/08* (2013.01); *H04W 72/02* (2013.01); *H04W 72/52* (2023.01)

(58) Field of Classification Search
None
See application file for complete search history.

(56) References Cited

U.S. PATENT DOCUMENTS

2020/0367035 A1* 11/2020 Lee ......................... H04W 4/70
2022/0150940 A1* 5/2022 Chang ............... H04W 72/1268
(Continued)

OTHER PUBLICATIONS

"3rd Generation Partnership Project; Technical Specification Group Radio Access Network; NR; Physical layer procedures for data (Release 16)", 3GPP TS 38.214, V16.6.0, Jun. 2021, pp. 1-172.
(Continued)

*Primary Examiner* — Andre Tacdiran
(74) *Attorney, Agent, or Firm* — McCarter & English, LLP

(57) ABSTRACT

Systems, methods, apparatuses, and computer program products for radio resource reservation for inter-UE coordination in NR sidelink mode 2. The method may include transmitting from a first user equipment to a second user equipment, a first coordination request to request a set of preferred or non-preferred radio resources for transmission by the first user equipment. The first coordination request may include at least a first resource indication value for indicating a first radio resource for transmission of a corresponding first coordination message by the second user equipment to the first user equipment. The method may also include receiving the corresponding first coordination message from the second user equipment transmitted on the first radio resource in response to the first coordination request.

14 Claims, 8 Drawing Sheets

Set of resources

UE-B
(Tx)

UE-A
(e.g., Rx)

(51) Int. Cl.
  *H04W 72/02*     (2009.01)
  *H04W 72/52*     (2023.01)

(56)          References Cited

U.S. PATENT DOCUMENTS

| | | | |
|---|---|---|---|
| 2024/0015755 A1* | 1/2024 | Pan ....................... | H04W 72/25 |
| 2024/0073875 A1* | 2/2024 | Leon Calvo .......... | H04W 72/25 |
| 2024/0334454 A1* | 10/2024 | Luo ....................... | H04W 28/26 |

OTHER PUBLICATIONS

Young, "USAP multiple access: dynamic resource allocation for mobile multihop multichannel wireless networking", IEEE Military Communications. Conference Proceedings (Cat. No.99CH36341), Oct. 31-Nov. 3, 1999, pp. 271-275.

Cain et al., "A link scheduling and ad hoc networking approach using directional antennas", IEEE Military Communications Conference, Oct. 13-16, 2003, pp. 643-648.

Grönkvist, "Interference-Based Scheduling in Spatial Reuse TDMA", Doctoral Thesis, Sep. 2005, 147 pages.

International Search Report and Written Opinion received for corresponding Patent Cooperation Treaty Application No. PCT/FI2022/050386, dated Sep. 2, 2022, 15 pages.

"Discussion on feasibility and benefits for mode 2 enhancements", 3GPP TSG RAN WG1 Meeting #104-e, R1-2101786, Agenda: 8.11.1.2, LG Electronics, Jan. 25-Feb. 5, 2021, 28 pages.

"Resource Allocation Enhancements for Mode 2", 3GPP TSG RAN WG1 Meeting #104-e, R1-2100702, Agenda: 8.11.1.2, Fraunhofer HHI, Jan. 25-Feb. 5, 2021, pp. 1-13.

"Discussion on mode 2 enhancements", 3GPP TSG RAN WG1 #105-e, R1-2106200, Agenda: 8.11.1.2, vivo, May 10-27, 2021, pp. 1-11.

"Inter-UE coordination in mode 2 sidelink resource allocation", 3GPP TSG RAN WG1 #105-e, R1-2104177, Agenda: 8.11.1.2, Nokia, May 10-27, 2021, 20 pages.

"WID revision: NR sidelink enhancement", 3GPP TSG RAN Meeting #90e, RP-202846, Agenda: 9.8.3, LG Electronics, Dec. 7-11, 2020, 6 pages.

"Inter-UE coordination for Mode 2 enhancements", 3GPP TSG RAN WG1 #106-e, R1-2106532, Agenda: 8.11.1.2, Nokia, Aug. 16-27, 2021, 22 pages.

* cited by examiner

Set of resources

UE-B
(Tx)

UE-A
(e.g., Rx)

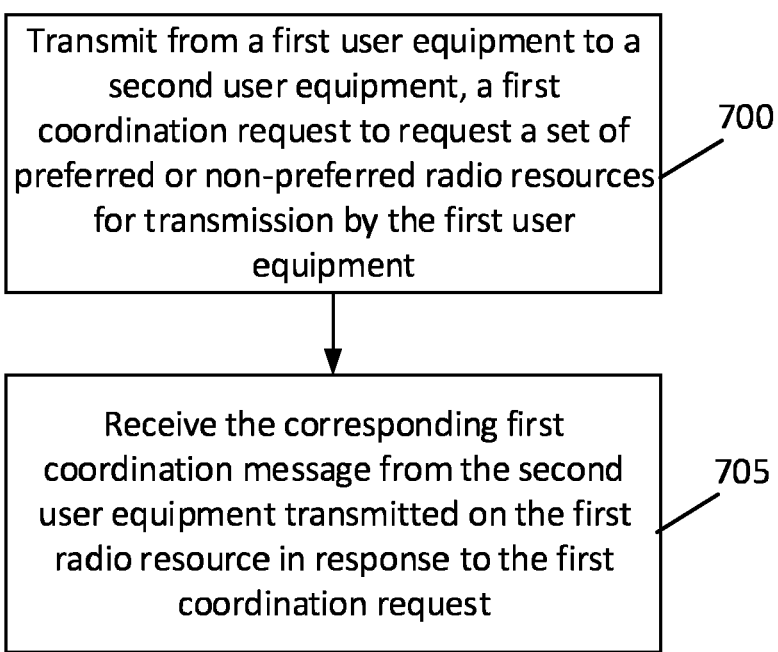

Transmit from a first user equipment to a second user equipment, a first coordination request to request a set of preferred or non-preferred radio resources for transmission by the first user equipment

700

Receive the corresponding first coordination message from the second user equipment transmitted on the first radio resource in response to the first coordination request

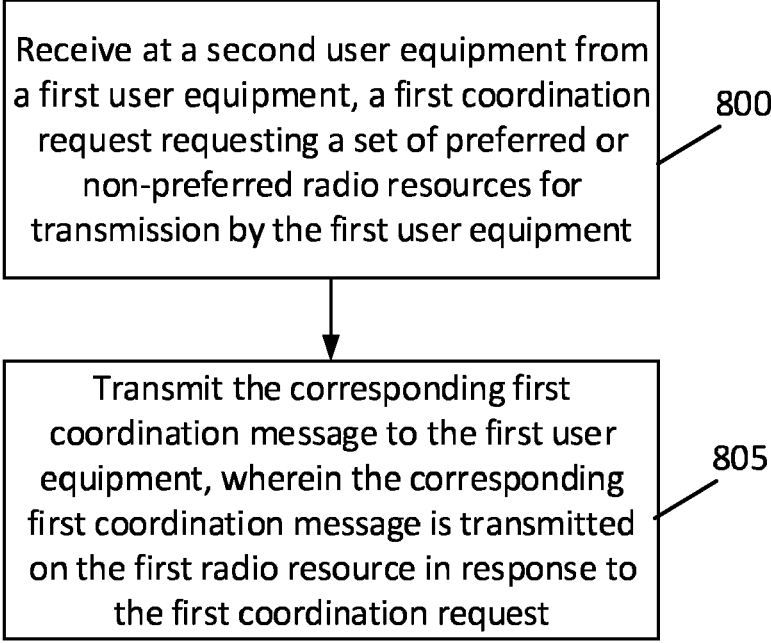

Receive at a second user equipment from a first user equipment, a first coordination request requesting a set of preferred or non-preferred radio resources for transmission by the first user equipment

800

Transmit the corresponding first coordination message to the first user equipment, wherein the corresponding first coordination message is transmitted on the first radio resource in response to the first coordination request

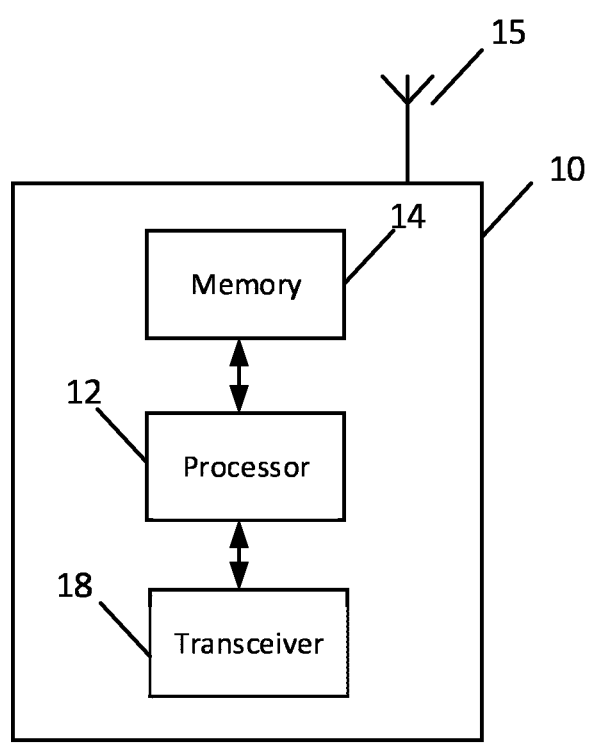
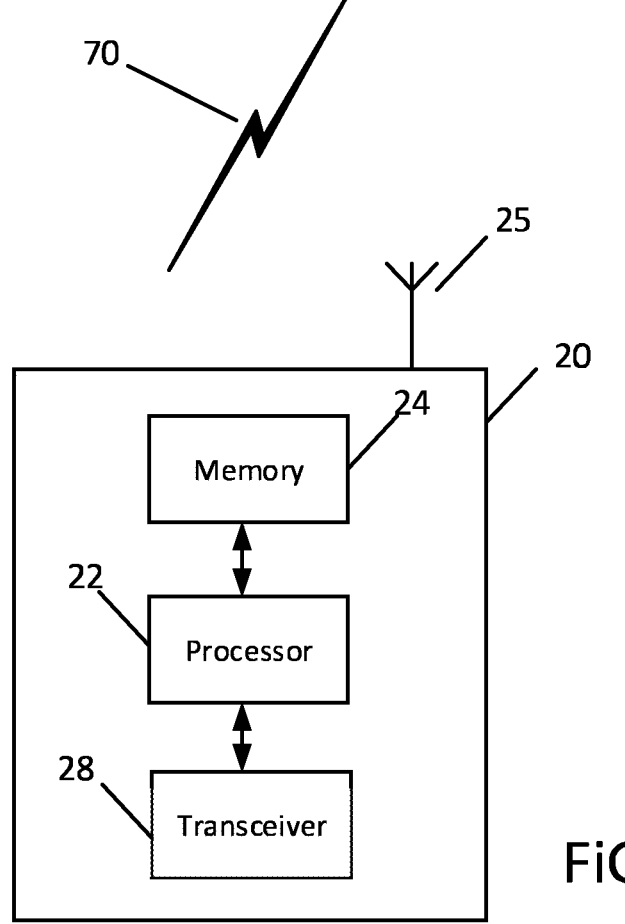
FiG. 9

RADIO RESOURCE RESERVATION FOR INTER-UE COORDINATION IN NR SIDELINK MODE 2

RELATED APPLICATION

This application was originally filed as PCT Application No. PCT/FI2022/050386 on Jun. 6, 2022, which claims priority from U.S. Provisional Application No. 63/228,864 filed on Aug. 3, 2021, both of which are incorporated herein by reference in their entirety.

FIELD

Some example embodiments may generally relate to mobile or wireless telecommunication systems, such as fifth generation (5G) new radio (NR) access technology, or other communications systems. For example, certain example embodiments may relate to apparatuses, systems, and/or methods for radio resource reservation for transmission of inter-user equipment (UE) coordination information in NR sidelink mode 2.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency communication (URLLC) as well as massive machine-type communication (mMTC). NR is expected to deliver extreme broadband and ultra-robust, low-latency connectivity and massive networking to support the Internet of Things (IoT).

SUMMARY

Some example embodiments may be directed to a method. The method may include transmitting, from a first user equipment to a second user equipment, a first coordination request to request a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include receiving the corresponding first coordination message from the second user equipment transmitted on the first radio resource in response to the first coordination request.

Other example embodiments may be directed to an apparatus. The apparatus may include at least one processor and at least one memory including computer program code. The at least one memory and computer program code may also be configured to, with the at least one processor, cause the apparatus at least to transmit a first coordination request to a user equipment to request a set of preferred or non-preferred radio resources for transmission by the apparatus. According to certain example embodiments, the first coordination request may include at least a first resource indication value for indicating a first radio resource for transmission of a corresponding first coordination message by the user equipment to the apparatus. The apparatus may also be caused to receive the corresponding first coordination message from the user equipment transmitted on the first radio resource in response to the first coordination request.

Other example embodiments may be directed to an apparatus. The apparatus may include means for transmitting a first coordination request to a user equipment to request a set of preferred or non-preferred radio resources for transmission by the apparatus. According to certain example embodiments, the first coordination request may include at least a first resource indication value for indicating a first radio resource for transmission of a corresponding first coordination message by the user equipment to the apparatus. The apparatus may also include means for receiving the corresponding first coordination message from the user equipment transmitted on the first radio resource in response to the first coordination request.

In accordance with other example embodiments, a non-transitory computer readable medium may be encoded with instructions that may, when executed in hardware, perform a method. The method may include transmitting, from a first user equipment to a second user equipment, a first coordination request to request a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include receiving the corresponding first coordination message from the second user equipment transmitted on the first radio resource in response to the first coordination request.

Other example embodiments may be directed to a computer program product that performs a method. The method may include transmitting, from a first user equipment to a second user equipment, a first coordination request to request a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include receiving the corresponding first coordination message from the second user equipment transmitted on the first radio resource in response to the first coordination request.

Other example embodiments may be directed to an apparatus that may include circuitry configured to transmit a first coordination request to a user equipment to request a set of preferred or non-preferred radio resources for transmission by the apparatus. According to certain example embodiments, the first coordination request may include at least a first resource indication value for indicating a first radio resource for transmission of a corresponding first coordination message by the user equipment to the apparatus. The apparatus may also include circuitry configured to receive the corresponding first coordination message from the user equipment transmitted on the first radio resource in response to the first coordination request.

Certain example embodiments may be directed to a method. The method may include receiving, at a second user equipment from a first user equipment, a first coordination request requesting a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include transmitting the corresponding first coordination message to the first user equipment, wherein the corresponding first coordination message is transmitted on the first radio resource in response to the first coordination request.

Other example embodiments may be directed to an apparatus. The apparatus may include at least one processor and at least one memory including computer program code. The at least one memory and computer program code may be configured to, with the at least one processor, cause the apparatus at least to receive a first coordination request from a user equipment requesting a set of preferred or non-preferred radio resources for transmission by the user equipment. According to certain example embodiments, the first coordination request may include at least a first resource indication value for indicating a first radio resource for transmission of a corresponding first coordination message by the apparatus to the user equipment. The apparatus may also be caused to transmit the corresponding first coordination message to the user equipment, wherein the corresponding first coordination message is transmitted on the first reserved radio resource in response to the first coordination request.

Other example embodiments may be directed to an apparatus. The apparatus may include means for receiving a first coordination request from a user equipment requesting a set of preferred or non-preferred radio resources for transmission by the user equipment. According to certain example embodiments, the first coordination request may include at least a first resource indication value for indicating a first radio resource for transmission of a corresponding first coordination message by the apparatus to the user equipment. The apparatus may also include means for transmitting the corresponding first coordination message to the user equipment, wherein the corresponding first coordination message is transmitted on the first radio resource in response to the first coordination request.

In accordance with other example embodiments, a non-transitory computer readable medium may be encoded with instructions that may, when executed in hardware, perform a method. The method may include receiving, at a second user equipment from a first user equipment, a first coordination request requesting a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include transmitting the corresponding first coordination message to the first user equipment, wherein the corresponding first coordination message is transmitted on the first radio resource in response to the first coordination request.

Other example embodiments may be directed to a computer program product that performs a method. The method may include receiving, at a second user equipment from a first user equipment, a first coordination request requesting a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. The method may also include transmitting the corresponding first coordination message to the first user equipment, wherein the corresponding first coordination message is transmitted on the first radio resource in response to the first coordination request.

Other example embodiments may be directed to an apparatus that may include circuitry configured to receive a first coordination request from a user equipment requesting a set of preferred or non-preferred radio resources for transmission by the user equipment. According to certain example embodiments, the first coordination request may include at least a first resource indication value for indicating a first radio resource for transmission of a corresponding first coordination message by the apparatus to the user equipment. The apparatus may also include circuitry configured to transmit the corresponding first coordination message to the user equipment, wherein the corresponding first coordination message is transmitted on the first radio resource in response to the first coordination request.

BRIEF DESCRIPTION OF THE DRAWINGS

For proper understanding of example embodiments, reference should be made to the accompanying drawings, wherein:

FIG. 7 illustrates an example flow diagram of a method, according to certain example embodiments.

FIG. 8 illustrates an example flow diagram of another method, according to certain example embodiments.

FIG. 9 illustrates an apparatus, according to certain example embodiments.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for radio resource reservation for inter-user equipment coordination (IUC) in new radio (NR) sidelink mode 2.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Figure 1:
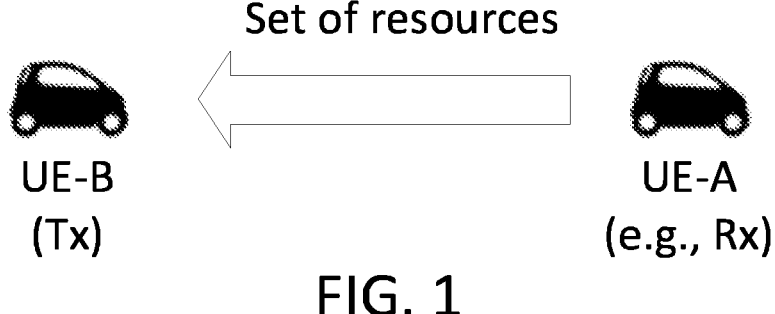
FIG. 1 illustrates an example inter-UE coordination (IUC) procedure.

FIG. 1 illustrates an example IUC procedure. The $3^{rd}$ Generation Partnership Project (3GPP) is considering NR sidelink enhancements such as those pertaining to FIG. 1. In particular, FIG. 1 illustrates an example IUC procedure where the coordination information sent from user equipment-A (UE-A) to UE-B is the set of radio resources preferred and/or non-preferred for UE-B's transmission. In some cases, the transmission of coordination information may be explicitly triggered by UE-B by means of a coordination request (CR).

Support for various coordination schemes of IUC in NR sidelink mode 2 are being considered. For example, in IUC scheme 1, the coordination information sent from UE-A to UE-B may be the set of radio resources preferred and/or non-preferred for UE-B's transmission. There may also be a possibility of down-selection between the preferred resource set and the non-preferred resource set, whether or not to include any additional information other than indicating time/frequency of the resources within the set in the coordination information.

In IUC scheme 2, the coordination information sent from UE-A to UE-B may include the presence of an expected/potential and/or detected resource conflict on the resources indicated by UE-B's sidelink control information (SCI). There may also be the possibility of down-selection between the expected/potential conflict and the detected resource conflict.

Additionally, there may be certain conditions for UEs to be UE-A(s)/UE-B(s) for IUC. For instance, there may be applicable scenario(s)/IUC schemes where only UE(s) among the intended receiver(s) of UE-B can be a UE-A, any UE may be a UE-A, high-layer configured, or the possibility of being subject to certain conditions and/or capability.

In certain cases, when UE-B receives the IUC information from UE-A, certain options may be considered for UE-B to take it into account in the resource (re)-selection for its own transmission. In some cases, it may be possible to down-select/merge one or more of the following options, and/or applicable scenario(s)/condition(s) for each option, along with UE behavior. In particular, for scheme 1, UE-B's resource(s) to be used for its transmission resource (re)-selection may be based on both UE-B's sensing result (if available) and the received coordination information. In another option, UE-B's resource(s) to be used for its transmission resource (re)-selection may be based only on the received coordination information. In a further option, UE-B's resource(s) may be re-selected based on the received coordination information.

For IUC scheme 2, one option may include UE-B being able to determine resource(s) to be re-selected based on the received coordination information. In another option, UE-B may determine a necessity of retransmission based on the received coordination information.

Figure 2:
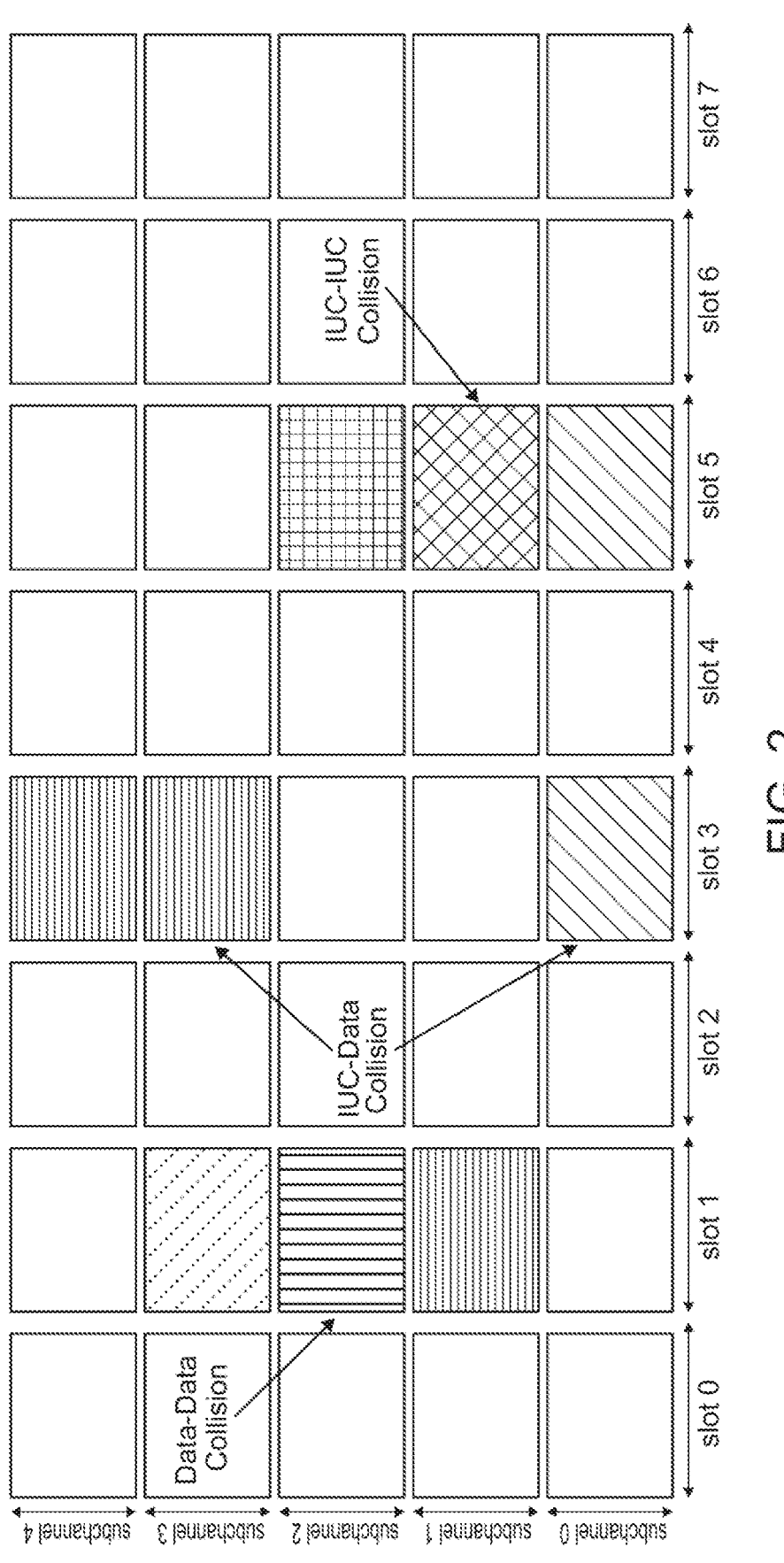
FIG. 2 illustrates an example of three different classes of collisions that may occur in NR sidelink mode 2 with IUC.

FIG. 2 illustrates an example of three different classes of collisions that may occur in NR sidelink mode 2 with IUC. In particular, as illustrated in FIG. 2, there may be a data-data collision, an IUC-data collision, and an IUC-IUC collision. In data-data collisions, collisions may occur between data transmissions. A data-data collision is shown in slot 1 of FIG. 2, where a first data transmission in subchannels 1-2 overlaps with a second data transmission in subchannels 2-3. 3GPP Rel-16 sensing is designed to reduce the probability of such data-data collisions. However, hidden-node and half-duplex related resource conflicts (among others) might occur. Rel-17 IUC, which may include both a proactive conflict avoidance scheme (e.g., IUC scheme 1), as well as a reactive conflict resolution scheme (e.g., IUC scheme 2), may reduce data-data collisions. However, the introduction of IUC itself gives rise to two further classes of collisions, namely, IUC-data collisions and IUC-IUC collisions.

IUC-data collisions may occur between a data transmission and an IUC transmission (e.g., a coordination request (CR) or a coordination message (CM)). An IUC-data collision is illustrated in slot 3 of FIG. 2, where an intended recipient (e.g., UE-B) of a data transmission in subchannels 3-4 is unable to receive the data transmission as a result of a half-duplex conflict due to its own transmission of an IUC message (e.g., CR) in subchannel 0 of the same slot. This type of collision may occur even if IUC transmissions do not overlap with data transmissions, for example, by configuring dedicated frequency resources (e.g., subchannel 0) for IUC transmission. On the other hand, configuring dedicated time resources (e.g., slots) for IUC transmission may eliminate this class of collisions, and this may be assumed in certain example embodiments, as discussed herein.

The third type of collision may include IUC-IUC collisions. These types of collisions may occur between a first IUC transmission (e.g., CR, CM) and a second IUC transmission (e.g., CR, CM). An IUC-IUC collision is illustrated in slot 5 of FIG. 2, where a first IUC transmission in subchannels 0-1 overlaps with a second IUC transmission in subchannels 1-2. This type of collision may occur even if dedicated time resources (e.g., slot 5) are configured for IUC transmission.

As noted above, certain example embodiments may involve resource reservation for IUC in NR sidelink mode 2. For instance, certain example embodiments may provide a device and method for enhanced transmission of IUC information in NR sidelink mode 2. In certain example embodiments, to reduce the collision probability among IUC transmissions, IUC resource reservation and sensing may be used. In addition to reserving resources for its own future IUC (re)transmission(s) (e.g., using 3GPP Rel-16 future resource indication in the $1^{st}$-stage SCI), a UE may reserve resources to be used for transmission by another UE. For instance, a CR from UE-B to UE-A may indicate (e.g., using a $2^{nd}$-stage SCI) a reserved resource for UE-A's CM transmission in response to UE-B's CR. In this way, IUC resource conflicts may be reduced. Furthermore, the size of the indicated reserved resource may be selected based on a measured IUC congestion level (e.g., channel busy ratio, CBR) such that robustness of IUC transmissions may be maintained and IUC latency kept within bounds under high IUC load.

Figure 3:
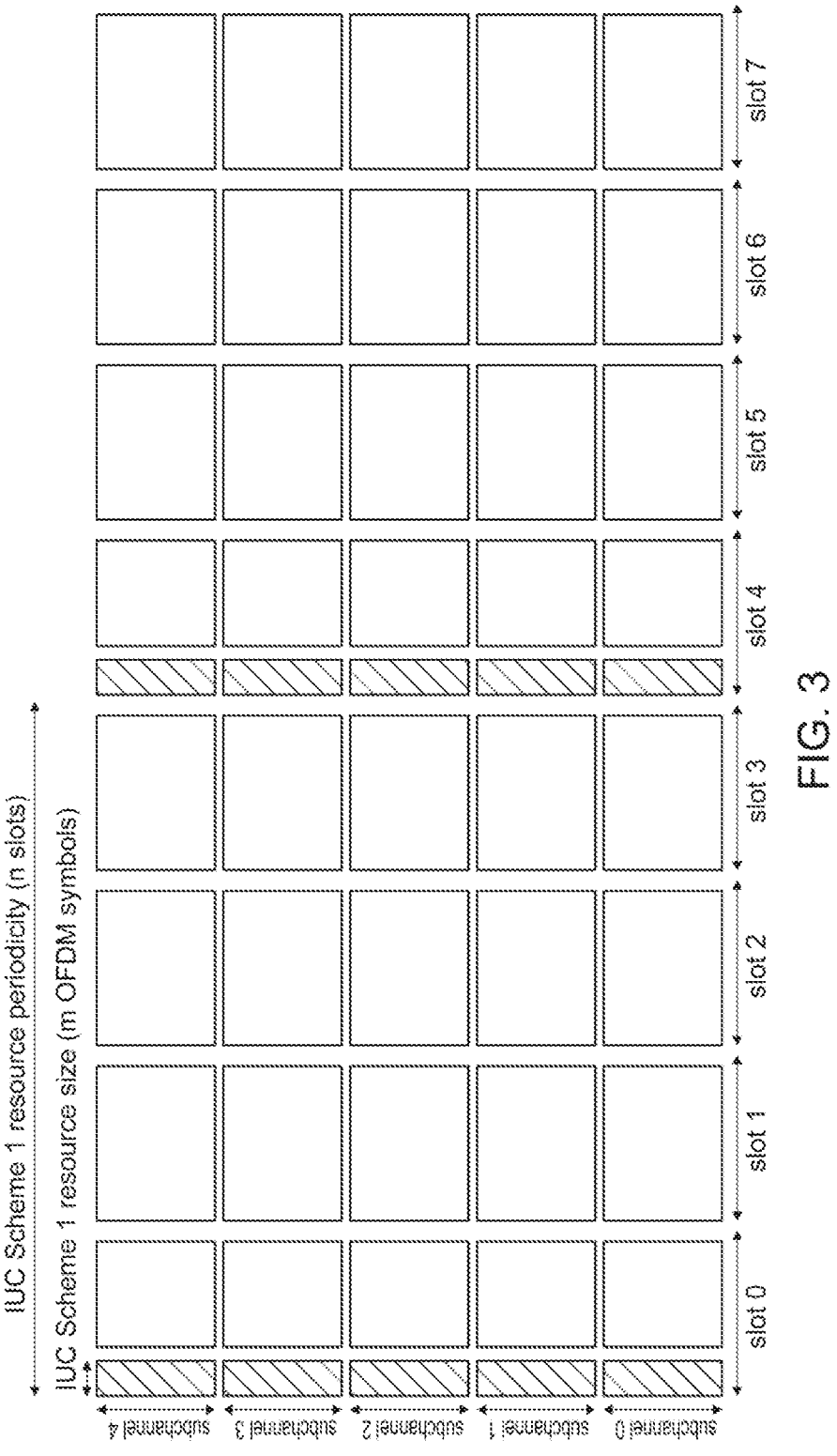
FIG. 3 illustrates an example set of dedicated radio resources for IUC scheme 1, according to certain example embodiments.

FIG. 3 illustrates an example set of dedicated radio resources for IUC scheme 1, according to certain example embodiments. In some example embodiments, a sidelink resource pool may be configured with dedicated resources including, for example, transmission opportunities for transmission of IUC messages (e.g., CR, CM). As illustrated in FIG. 3, such configuration may include an IUC resource size (e.g., m contiguous orthogonal frequency division multiplexing (OFDM) symbols), and an IUC resource periodicity (e.g., n slots). In the example of FIG. 3, m=3 OFDM symbols may be configured for every n=4 slots for IUC transmission. In addition, an OFDM symbol may be used as a guard time following each IUC transmission opportunity, similar to the guard symbol at the end of each slot. Alternatively, IUC resources may be configured as full dedicated slots.

In some example embodiments, IUC traffic may be aperiodic, where an IUC message (CR, CM) may "arrive" (e.g., be triggered) at a UE in a more or less random fashion. For instance, in some example embodiments, IUC traffic may follow a Poisson arrival process. According to certain example embodiments, to reduce IUC latency, a triggered IUC message (CR, CM) may be transmitted as soon as possible. For instance, the triggered IUC message may be transmitted at the earliest IUC transmission opportunity. It is worth noting that high IUC latency may render an IUC message useless, as the coordination information (i.e., set of preferred or non-preferred resources) may be stale by the time it can be used.

However, if IUC traffic intensity is high, it may not be possible to find available resources at the earliest IUC transmission opportunity. In some example embodiments, a UE may determine IUC resource availability based on sensing in the IUC resources. For example, a UE may determine certain subchannels that have been reserved at a given IUC transmission opportunity based on SCI decoded by the UE at an earlier IUC transmission opportunity. In addition, a UE may be configured to exclude occupied (e.g., reserved) IUC resources from resource selection for its own IUC transmission. From the remaining, non-excluded resources, a UE may randomly select a resource.

With reference to FIG. 3, a first UE may trigger a first IUC message (CR, CM) at a random time between two consecutive IUC transmission opportunities. The first UE may determine (based on sensing in prior IUC transmission opportunities) a number M of available subchannels in the upcoming IUC transmission opportunity, out of a total number N of subchannels in the resource pool (e.g., N=5 subchannels in FIG. 3). Furthermore, a second UE may trigger a second IUC message (CR, CM) at a random time between the same two consecutive IUC transmission opportunities. If the second UE determines the same M available subchannels (based on its own sensing in prior IUC transmission opportunities), and assuming that the first and second IUC messages each fits in a single subchannel, the probability that both UEs randomly select the same IUC resource (i.e., subchannel) resulting in an IUC-IUC collision, is 1/M. For example, if all N=5 subchannels are determined to be available by both UEs (i.e., M=N), the probability that both UEs select the same subchannel for IUC transmission is 1/5.

In general, the probability that no IUC-IUC collision occurs in an upcoming IUC transmission opportunity (assuming N available subchannels), may be modeled as follows:

$$Pr(\text{no collision}) = \sum_{k=0}^{N} Pr(k \text{ arrivals}) Pr(\text{no collision}|k \text{ arrivals}),$$

where the number k of IUC messages (CR, CM) triggered within an IUC interval T (i.e., IUC resource periodicity (in slots)×slot duration) may be modeled as a Poisson distributed random variable, i.e.:

$$Pr(k \text{ arrivals}) = \frac{(\lambda T)^k}{k!} e^{-\lambda T},$$

where $\lambda$ denotes an IUC traffic intensity (i.e., arrival rate). The conditional probability that no IUC-IUC collision occurs, given that k IUC messages were triggered, may be obtained as follows (assuming k random selections of 1 among N subchannels):

$$Pr(\text{no collision}|k \text{ arrivals}) = k! \binom{N}{k} N^{-k}$$

Here, no IUC-IUC collision is assumed to occur if the k triggered IUC messages are transmitted in different subchannels. Half-duplex related conflicts, such as a UE not being able to receive a first IUC message in a first subchannel due to its own simultaneous transmission of a second IUC message in a second subchannel, are not taken into account. Thus, the probability of no IUC-IUC collision may be obtained as follows:

$$Pr(\text{no collision}) =$$

$$\sum_{k=0}^{N} \frac{(\lambda T)^k}{k!} e^{-\lambda T} k! \binom{N}{k} N^{-k} = e^{-\lambda T} \sum_{k=0}^{N} \binom{N}{k} \left(\frac{\lambda T}{N}\right)^k = e^{-\lambda T} \left(1 + \frac{\lambda T}{N}\right)^N$$

Figure 4:
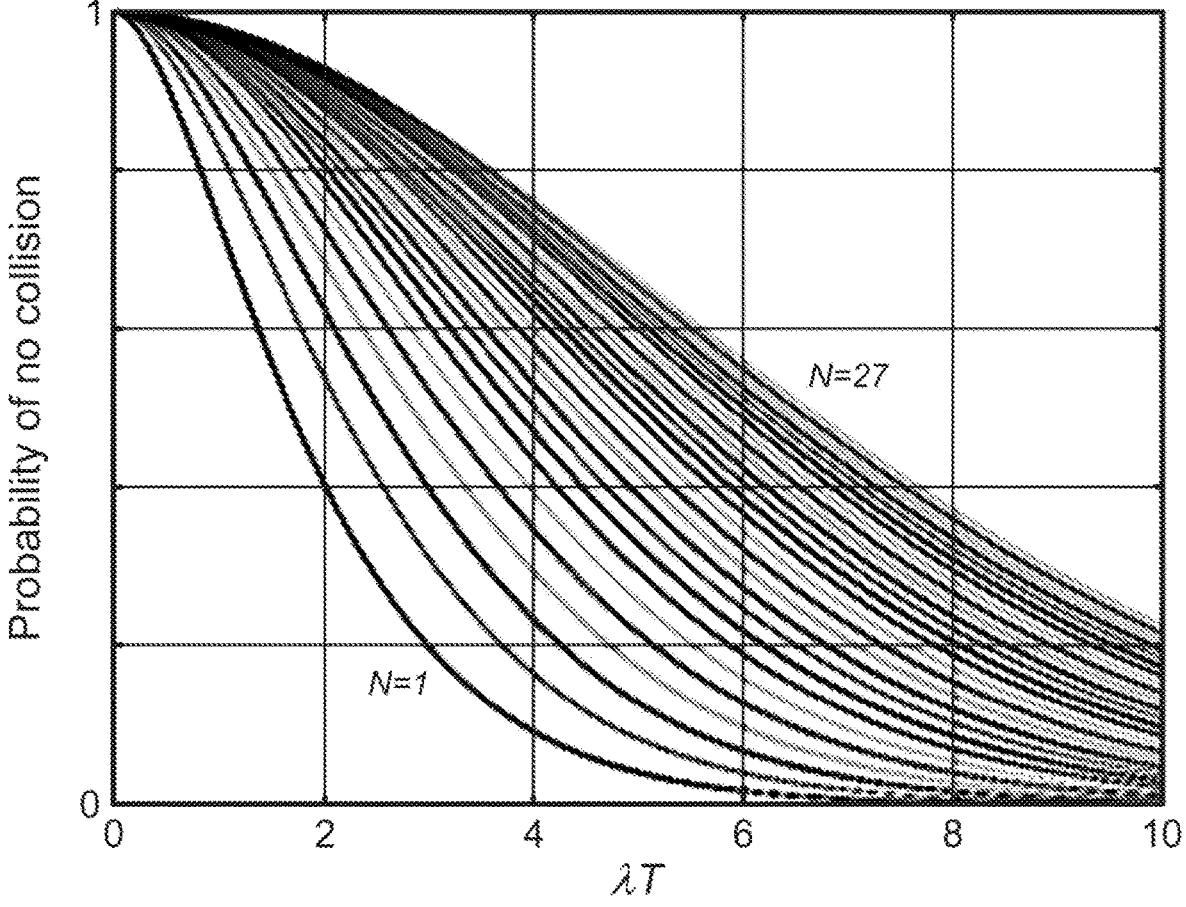
FIG. 4 illustrates an example probability of no IUC-IUC collision, according to certain example embodiments.

FIG. 4 illustrates an example probability of no IUC-IUC collision, according to certain example embodiments. In particular, the probability Pr (no collision) illustrated in FIG. 4 may depend on the IUC traffic intensity $\lambda$ and IUC interval T, as well as the number of subchannels N.

According to certain example embodiments, in order to reduce the probability of IUC-IUC collisions, it may be possible to distinguish between CR and CM messages, rather than treating all IUC messages equally. Although a CR may be triggered at any time more or less randomly, in certain example embodiments, a CM may be triggered by the reception of a CR. Thus, a first UE (UE-B) may include in a CR (e.g., using a $2^{nd}$-stage SCI) a time and/or frequency resource allocation indication indicating to a second UE (UE-A) at least one IUC resource (e.g., slot and/or subchannels) for transmission of a corresponding CM by the second UE (UE-A). In this way, UE-B may effectively "schedule" UE-A's CM transmission. The time and/or frequency resource allocation indication may be similar to the time resource indication value (TRIV) and frequency resource indication value (FRIV) conveyed, respectively, by the "time resource assignment" and "frequency resource assignment" fields in a $1^{st}$-stage SCI.

In certain example embodiments, the IUC resource to be used by the second UE (UE-A) for its CM transmission may be conveyed in a $2^{nd}$-stage SCI associated with the CR transmission by the first UE (UE-B). In further example embodiments, the IUC resource to be used by the second UE (UE-A) for its CM transmission may be conveyed in a $1^{st}$-stage SCI associated with the CR transmission by the first UE (UE-B). For example, the TRIV/FRIV values in the $1^{st}$-stage SCI may indicate two reserved resources, one for CM transmission by the second UE (UE-A) and another for eventual CR retransmission by the first UE (UE-B).

Figure 5:
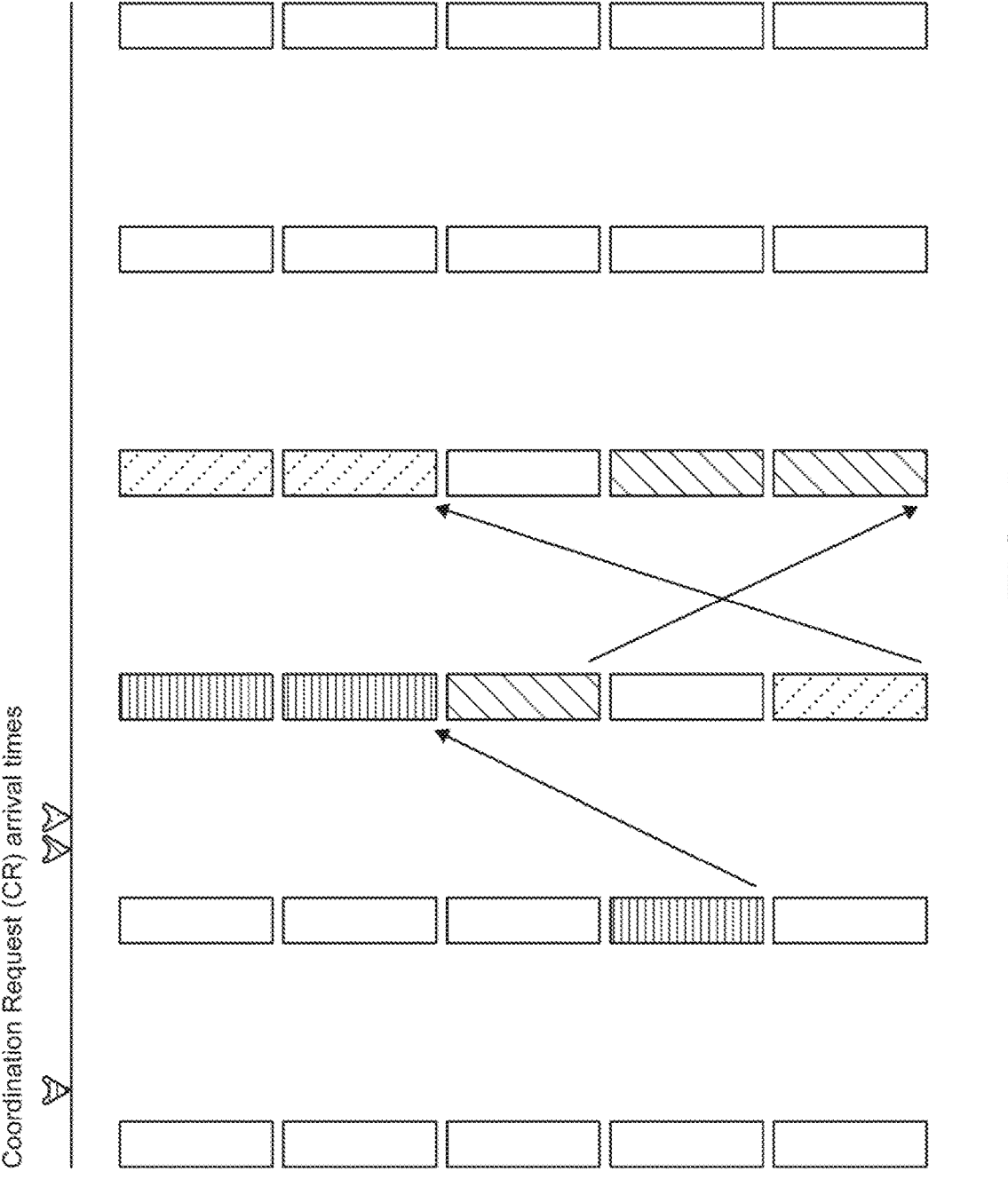
FIG. 5 illustrates an example coordination request (CR)-based IUC radio resource reservation for a coordination message (CM) transmission, according to certain example embodiments.

FIG. 5 illustrates an example CR-based IUC resource reservation for a CM transmission, according to certain example embodiments. As illustrated in the example of FIG. 5, each vertical bar represents an IUC transmission opportunity (e.g., including m contiguous OFDM symbols). In the first IUC interval (i.e., between the first and the second IUC transmission opportunities), UE-B1 may trigger a CR to be transmitted to UE-A1. Based on its sensing in prior IUC transmission opportunities, UE-B1 may determine available IUC resources, and select an IUC resource for CR transmission. For example, a subchannel may be randomly selected among unreserved subchannels at the earliest possible IUC transmission opportunity. Here, UE-B1 is shown transmitting its CR at the second IUC transmission opportunity on subchannel 1. The CR may indicate to UE-A1 when/where to transmit the corresponding CM. In this example, the CR indicates transmission of the corresponding CM at the third IUC transmission opportunity on subchannels 3-4.

As further illustrated in the example of FIG. 5, in the second IUC interval (i.e., between the second and third IUC transmission opportunities), UE-B2 and UE-B3 may trigger CRs to be transmitted to UE-A2 and UE-A3, respectively. Having sensed the CR transmission by UE-B1, UE-B2 and UE-B3 may exclude from their IUC resource selection subchannels 3-4 at the third IUC transmission opportunity. Doing so may avoid interfering with UE-B1's reception of UE-A1's CM transmission. Other subchannels may also be excluded based on reservations indicated in SCI decoded in previous IUC transmission opportunities. From the remaining IUC resources, UE-B2 and UE-B3 may select an IUC resource for their respective CR transmission. In this example, UE-B2 may select subchannel 2, and UE-B3 may select subchannel 0, both at the third IUC transmission opportunity. The respective CRs may indicate, in turn, the IUC resource to be used for CM transmission by UE-A2 and UE-A3, respectively.

According to certain example embodiments, if UE-A2 (or UE-A3) is the same as UE-A1, UE-B2 (or UE-B3) may discard the third transmission opportunity altogether for CR transmission, as UE-A1 is scheduled to transmit the CM to UE-B1 at that time, and therefore it would not be able to receive the CR from UE-B2 (or UE-B3).

In certain example embodiments, when selecting an IUC resource for receiving the CM from UE-A, UE-B may take into account its own IUC sensing. For example, UE-B may ensure that UE-A is not expected to receive a CR or CM from a third node (UE-C) in the slot in which it should transmit its CM to UE-B, as that would result in a half-duplex conflict at UE-A. Similarly, UE-B may rely on its own IUC sensing to avoid scheduling UE-A's CM transmission in IUC resources reserved for other UE's IUC transmissions. Thus, in certain example embodiments, UE-B may take advantage of a decoded CR previously transmitted by UE-A, or by a third UE. For example, UE-B may derive, from a previously received CR, an IUC resource in which UE-A expects to receive a CM from a third UE. Similarly, an IUC resource indicated by a third UE for retransmission of a CR to UE-A may be avoided, to be on the safe side (i.e., in case the CR retransmission occurs).

According to certain example embodiments, UE-B may also take into account its own IUC sensing when determining a resource size (e.g., length of contiguously allocated subchannels) for the CM transmission by UE-A. For example, the resource size may be selected by UE-B based on an estimated IUC congestion level (e.g., IUC channel busy ratio (CBR)) derived from UE-B's IUC sensing. In this way, IUC congestion control may be achieved and robustness of IUC transmissions may be maintained under high IUC load while ensuring low IUC transmission latency. According to certain example embodiments, the selected resource size for the CM transmission by UE-A may influence the cardinality of the (preferred and/or non-preferred) resource set that may be conveyed using the IUC resource (e.g., a smaller IUC resource may not be able to convey a large resource set), which may in turn impact the performance of IUC itself. For example, based on a resource size indicated by UE-B, UE-A may determine a resource set cardinality for its CM transmission to UE-B. If UE-B, based on its own IUC sensing, determines a high IUC congestion level, it may select a single subchannel for the CM transmission by UE-A, resulting potentially in a small resource set recommendation. However, in some example embodiments, UE-A may still be able to convey a larger set, for example, by selecting a high modulation and coding scheme (MCS) for the CM transmission in case channel quality is determined to be good enough.

Figure 6:
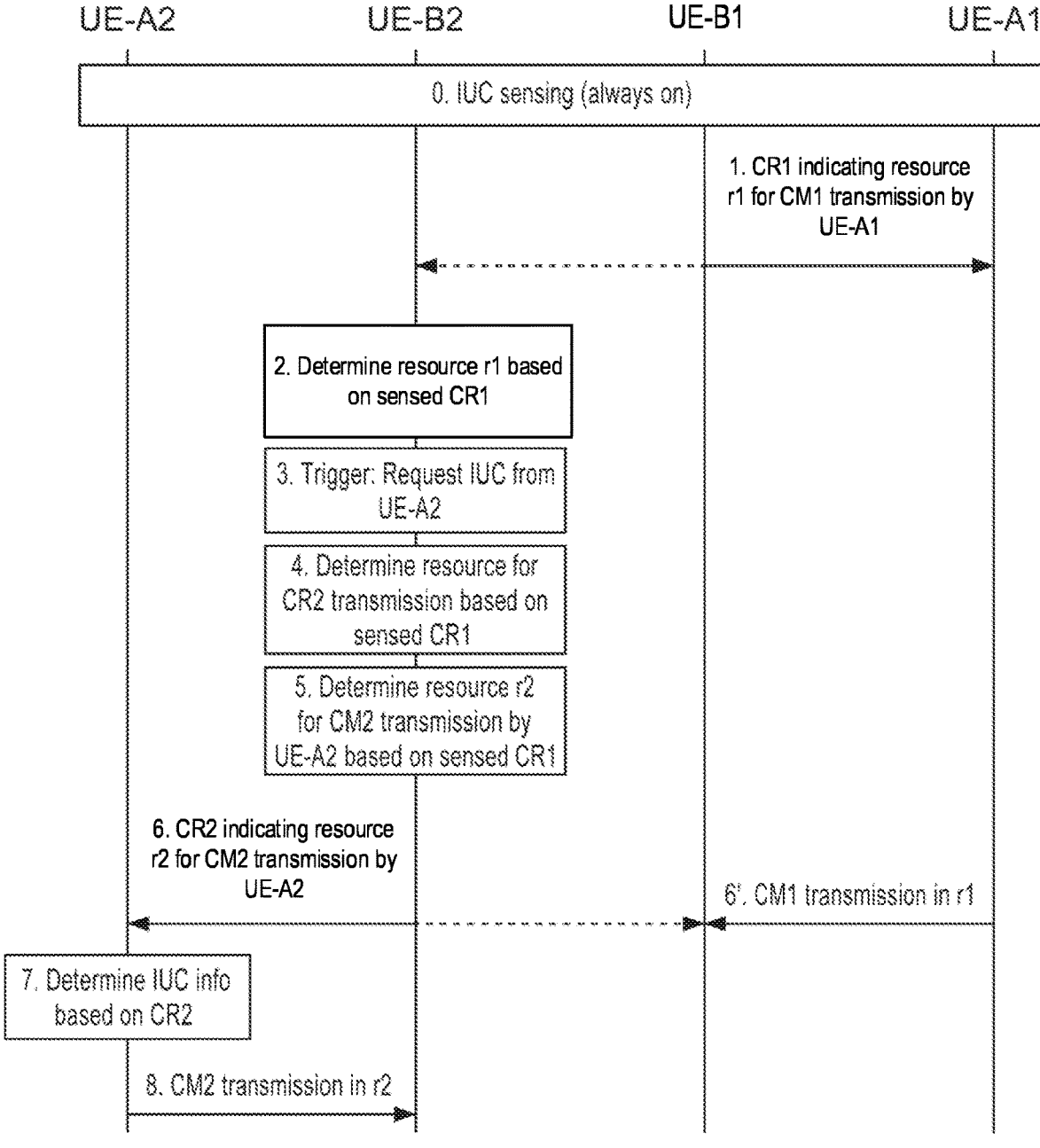
FIG. 6 illustrates an example signal flow diagram of radio resource reservation for an IUC transmission, according to certain example embodiments.

FIG. 6 illustrates an example signal flow diagram of radio resource reservation for IUC transmission, according to certain example embodiments. In step 0, IUC sensing may be on, and each UE may be assumed to perform IUC sensing in each IUC transmission opportunity in which it does not transmit an IUC message itself, to detect IUC transmissions by other UEs. In step 1, a coordination request (CR1) may be transmitted by UE-B1 to UE-A1 requesting coordination information from UE-A1. According to certain example embodiments, CR1 may indicate a resource (r1) determined by UE-B1 for transmission of a corresponding coordination message (CM1) by UE-A1. In step 2, UE-B2, having sensed the coordination request (CR1) transmitted by UE-B1, may determine the resource (r1) in which UE-B1 expects to receive the coordination message (CM1) from UE-A1 (shown in step 6').

As further illustrated in the example of FIG. 6, in step 3, UE-B2 may trigger a coordination request (CR2) to request coordination information from UE-A2. Further, in step 4, UE-B2 may determine a resource for transmitting its coordination request (CR2) based on the sensed coordination request (CR1) from UE-B1. For example, UE-B2 may select a resource for CR2 transmission that does not overlap in time and/or frequency with the determined resource (r1) in which UE-B1 expects to receive CM1. In this way, a potential collision between CR2 and CM1 may be prevented.

In the example of FIG. 6, in step 5, UE-B2 may further determine a resource (r2) for transmission of a corresponding coordination message (CM2) by UE-A2. In certain example embodiments, such determination may also be based on the sensed coordination request (CR1) from UE-B1. For example, UE-B2 may select a resource (r2) for CM2 transmission by UE-A2 that does not overlap in time and/or frequency with the determined resource (r1) in which UE-A1 is expected to transmit CM1. In this way, a potential collision between CM1 and CM2 may be prevented.

In the example of FIG. 6, in step 6, UE-B2 may transmit its coordination request (CR2) in the resource determined in step 4. Further, CR2 may indicate to UE-A2 the resource (r2), determined by UE-B2 in step 5, for transmission of CM2 by UE-A2. At 6', UE-A1 may transmit its coordination message (CM1) to UE-B1, possibly in the same IUC transmission opportunity as CR2 transmission by UE-B2. However, CR2 may not interfere with UE-B1's reception of CM1 if the corresponding resources do not overlap in frequency.

In the example of FIG. 6, in step 7, UE-A2 may determine its coordination information (i.e., set of preferred and/or non-preferred resources for UE-B2's transmission) based on the content of the received coordination request (CR2) from UE-B2. Further, in step 8, UE-A2 may transmit its coordination message (CM2) in the resource (r2) determined by UE-B2 in step 5.

FIG. 7 illustrates an example flow diagram of a method, according to certain example embodiments. For instance, in an example embodiment, the method of FIG. 7 may be performed by a UE, for instance, UE-B, similar to apparatuses 10 or 20 illustrated in FIG. 9(*a*) or 9(*b*).

According to certain example embodiments, the method of FIG. 7 may include, at 700, transmitting from a first user equipment to a second user equipment, a first coordination request to request a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. At 705, the method may also include receiving the corresponding first coordination message from the second user equipment transmitted on the first radio resource in response to the first coordination request.

According to certain example embodiments, the first coordination request may also include a second resource indication value for indicating a second radio resource for retransmission of the first coordination request. According to some example embodiments, the second radio resource may occur after the first radio resource. In certain example embodiments, the method may also include determining a radio resource for transmitting the first coordination request based on a sensed second coordination request transmitted by the second user equipment or a third user equipment. In other example embodiments, determining the radio resource for transmitting the first coordination request may include excluding or deprioritizing a candidate radio resource if it overlaps, at least in time, with a radio resource indicated by the sensed second coordination request. In some example embodiments, the method may further include determining the first radio resource or the second radio resource based on the sensed second coordination request. In certain example embodiments, determining the first radio resource or the second radio resource may include excluding or deprioritizing a candidate radio resource if it overlaps, at least in time, with a radio resource indicated by the sensed second coordination request. According to certain example embodiments, the method may also include determining a resource size for the first radio resource based on a measured congestion level, such as a channel busy ratio (CBR).

FIG. 8 illustrates an example flow diagram of another method, according to certain example embodiments. For instance, in an example embodiment, the method of FIG. 8 may be performed by another UE, for instance, UE-A, similar to apparatuses 10 or 20 illustrated in FIG. 9(*a*) or 9(*b*).

According to certain example embodiments, the method of FIG. 8 may include, at 800, receiving at a second user equipment from a first user equipment, a first coordination request requesting a set of preferred or non-preferred radio resources for transmission by the first user equipment. According to certain example embodiments, the first coordination request may include at least a first resource indication value for indicating a first radio resource for transmission of a corresponding first coordination message by the second user equipment to the first user equipment. At 805, the method may also include transmitting the corresponding first coordination message to the first user equipment, wherein the corresponding first coordination message is transmitted on the first radio resource in response to the first coordination request.

According to certain example embodiments, the first coordination request may further include a second resource indication value for indicating a second radio resource for retransmission of the first coordination request. According to some example embodiments, the second radio resource may occur after the first radio resource. In some example embodiments, a cardinality of the set of preferred or non-preferred radio resources may be dependent upon a resource size for the first radio resource.

FIG. 9 illustrates a set of apparatuses 10 and 20 according to certain example embodiments. In certain example embodiments, apparatus 10 may be a node or element in a communications network or associated with such a network, such as a UE, UE-A, UE-B, mobile equipment (ME), mobile station, mobile device, stationary device, or other device. It should be noted that one of ordinary skill in the art would understand that apparatus 10 may include components or features not shown in FIG. 9.

In some example embodiments, apparatus 10 may include one or more processors, one or more computer-readable storage media (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IOT, Bluetooth, NFC, MulteFire, and/or any other radio access technologies. It should be noted that one of ordinary skill in the art would understand that apparatus 10 may include components or features not shown in FIG. 9.

As illustrated in the example of FIG. 9, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 9, multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-7.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-7.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IOT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to transmit a first coordination request to a user equipment to request a set of preferred or non-preferred radio resources for transmission by the apparatus. According to certain example embodiments, the first coordination request may include at least a first resource indication value for indicating a first radio resource for transmission of a corresponding first coordination message by the user equipment to the apparatus. Apparatus 10 may further be controlled by memory 14 and processor 12 to receive the corresponding first coordination message from the user equipment transmitted on the first radio resource in response to the first coordination request.

As illustrated in the example of FIG. 9, an apparatus 20 may be a node or element in a communications network or associated with such a network, such as a UE, UE-A, UE-B, mobile station, mobile device, stationary device, or other device. It should be noted that one of ordinary skill in the art would understand that apparatus 20 may include components or features not shown in FIG. 9.

As illustrated in the example of FIG. 9, apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 9, multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-6 and 8.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-6 and 8.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to receive a first coordination request from a user equipment requesting a set of preferred or non-preferred radio resources for transmission by the user equipment. According to certain example embodiments, the first coordination request may include at least a first resource indication value for indicating a first radio resource for transmission of a corresponding first coordination message by the apparatus to the user equipment. Apparatus 20 may also be controlled by memory 24 and processor 22 to transmit the corresponding first coordination message to the user equipment, wherein the corresponding first coordination message is transmitted on the first radio resource in response to the first coordination request.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for transmitting a first coordination request to a user equipment to request a set of preferred or non-preferred radio resources for transmission by the apparatus. According to certain example embodiments, the first coordination request may include at least a first resource indication value for indicating a first radio resource for transmission of a corresponding first coordination message by the user equipment to the apparatus. According to other example embodiments, the apparatus may include means for receiving the corresponding first coordination message from the user equipment transmitted on the first radio resource in response to the first coordination request.

Other example embodiments may be directed to an apparatus that includes means for receiving a first coordination request from a user equipment requesting a set of preferred or non-preferred radio resources for transmission by the user equipment. According to certain example embodiments, the first coordination request comprises at least a first resource indication value for indicating a first radio resource for transmission of a corresponding first coordination message by the apparatus to the user equipment. The apparatus may also include means for transmitting the corresponding first coordination message to the user equipment, wherein the corresponding first coordination message is transmitted on the first radio resource in response to the first coordination request.

Certain example embodiments described herein provide several technical improvements, enhancements, and/or advantages. In some example embodiments, it may be possible for UEs to successfully decode UE-B's CR, which may allow the UEs to determine (e.g., from the $2^{nd}$-stage SCI) the IUC resource in which UE-B is expected to receive the CM. As such, it may be possible to avoid transmitting an IUC message in that IUC resource, e.g., to prevent interference with UE-B's CM reception. Similarly, they may avoid transmitting an IUC message (e.g., CR) intended for UE-A in the indicated slot, as UE-A may be expected to transmit the CM to UE-B in that slot (assuming UE-A is able to decode the CR transmission from UE-B), and that may result in a half-duplex conflict at UE-A (i.e., UE-A's CM transmission may interfere with its own reception of the IUC message).

According to other example embodiments, UE-B may expect to receive the CM in the indicated IUC resource. Thus, UE-B may refrain from transmitting a further IUC message in the corresponding IUC transmission opportunity, as that would result in a half-duplex conflict at UE-B (i.e., UE-B's transmission would interfere with its own reception of UE-A's CM).

In further example embodiments, UE-B may know when and where the CM will be transmitted by UE-A. Thus, if no CM is received from UE-A in the indicated IUC resource, UE-B may infer that the CR transmission failed and retransmit the CR (i.e., no explicit HARQ feedback is needed for the CR transmission, as the CM itself serves as an implicit ACK). An IUC resource for CR retransmission (occurring at an IUC transmission opportunity following that in which the CM is to be transmitted) may be indicated (e.g., using a $1^{st}$-stage SCI) in the initial CR transmission. If UE-A receives the CR retransmission despite having transmitted the CM, it may infer that UE-B was not able to decode the CM (i.e., no explicit HARQ feedback is needed for the CM transmission either, as the retransmitted CR itself serves as an implicit NACK). Similar to the initial CR, the retransmitted CR may indicate to UE-A an IUC resource for (re)transmission of the CM. Thus, example embodiments can at least improve the functioning of communications networks and their associated nodes.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BS Base Station
CBR Channel Busy Ratio
CM Coordination Message
CR Coordination Request
eNB Enhanced Node B
FRIV Frequency Resource Indication Value
gNB 5G or Next Generation NodeB
LTE Long Term Evolution
NR New Radio
PSCCH Physical Sidelink Control Channel
PSFCH Physical Sidelink Feedback Channel
PSSCH Physical Sidelink Shared Channel
SCI Sidelink Control Information
TRIV Time Resource Indication Value
UE User Equipment

The invention claimed is:

1. A method, comprising:
    transmitting, from a first user equipment to a second user equipment, a first coordination request to request a set of preferred or non-preferred radio resources for transmission by the first user equipment, wherein the first coordination request comprises at least a first resource indication value for indicating a first radio resource for transmission of a corresponding first coordination message by the second user equipment to the first user equipment, and wherein the first coordination request further comprises a second resource indication value for indicating a second radio resource for retransmission of the first coordination request, and wherein the second radio resource occurs after the first radio resource; and receiving the corresponding first coordination message from the second user equipment transmitted on the first radio resource in response to the first coordination request.

2. The method according to claim 1, further comprising: determining a radio resource for transmitting the first coordination request based on a sensed second coordination request transmitted by the second user equipment or a third user equipment.

3. The method according to claim 2, wherein determining the radio resource for transmitting the first coordination request comprises excluding or deprioritizing a candidate radio resource if it overlaps with a radio resource indicated by the sensed second coordination request.

4. The method according to claim 3, further comprising: determining the first radio resource or the second radio resource based on the sensed second coordination request.

5. The method according to claim 4, wherein determining the first radio resource or the second radio resource comprises excluding or deprioritizing a candidate radio resource if it overlaps with a radio resource indicated by the sensed second coordination request.

6. The method according to claim 1, further comprising: determining a resource size for the first radio resource based on a measured congestion level.

7. An apparatus, comprising:
at least one processor; and
at least one memory storing instructions that,
    when executed by the at least one processor, cause the apparatus at least to:
transmit a first coordination request to a user equipment to request a set of preferred or non-preferred radio resources for transmission by the apparatus, wherein the first coordination request comprises at least a first resource indication value for indicating a first radio resource for transmission of a corresponding first coordination message by the user equipment to the apparatus, and wherein the first coordination request further comprises a second resource indication value for indicating a second radio resource for retransmission of the first coordination request, and wherein the second radio resource occurs after the first radio resource; and
receive the corresponding first coordination message from the user equipment transmitted on the first radio resource in response to the first coordination request.

8. The apparatus according to claim 7, wherein the at least one memory stores instructions that, when executed by the at least one processor, cause the apparatus at least to: determine a radio resource for transmitting the first coordination request based on a sensed second coordination request transmitted by the user equipment or another user equipment.

9. The apparatus according to claim 8, wherein determining the radio resource for transmitting the first coordination request comprises excluding or deprioritizing a candidate radio resource if it overlaps with a radio resource indicated by the sensed second coordination request.

10. The apparatus according to claim 7, wherein the at least one memory stores instructions that, when executed by the at least one processor, cause the apparatus at least to: determine a resource size for the first radio resource based on a measured congestion level.

11. The apparatus according to claim 9, wherein the at least one memory stores instructions that, when executed by the at least one processor, cause the apparatus at least to: determine the first radio resource or the second radio resource based on the sensed second coordination request.

12. The apparatus according to claim 11, wherein determining the first radio resource or the second radio resource comprises excluding or deprioritizing a candidate radio resource if it overlaps with a radio resource indicated by the sensed second coordination request.

13. An apparatus, comprising:
at least one processor; and
at least one memory storing instructions that,
    when executed by the at least one processor, cause the apparatus at least to:
receive a first coordination request from a user equipment requesting a set of preferred or non-preferred radio resources for transmission by the user equipment, wherein the first coordination request comprises at least a first resource indication value for indicating a first radio resource for transmission of a corresponding first coordination message by the apparatus to the user equipment, and wherein the first coordination request further comprises a second resource indication value for indicating a second radio resource for retransmission of the first coordination request, and wherein the second radio resource occurs after the first radio resource; and
transmit the corresponding first coordination message to the user equipment, wherein the corresponding first coordination message is transmitted on the first radio resource in response to the first coordination request.

14. The apparatus according to claim 13, wherein a cardinality of the set of the preferred or the non-preferred radio resources is dependent upon a resource size for the first radio resource.

* * * * *